United States Patent

Paine et al.

[15] 3,699,799
[45] Oct. 24, 1972

[54] VARIABLE DIRECTION FORCE COUPLER

[72] Inventors: Thomas O. Paine, Administrator of the National Aeronautics and Space Administration with respect to an invention of; William H. Hespenhide

[22] Filed: Aug. 28, 1970

[21] Appl. No.: 67,730

[52] U.S. Cl. .....................72/447, 72/476, 173/131
[51] Int. Cl. ..............................................B21j 15/40
[58] Field of Search........72/476, 478, 479, 465, 434, 72/447, 452, 431, 433, 705; 81/177 F; 64/2 P, 2 R; 145/61 D; 173/131, 133

[56] References Cited

UNITED STATES PATENTS

| | | | |
|---|---|---|---|
| 2,605,808 | 8/1952 | Current | 72/705 |
| 3,260,069 | 7/1966 | Neilson | 64/2 R |
| 3,399,584 | 9/1968 | Lewicki | 64/2 R |
| 1,883,968 | 10/1932 | Krivig | 72/431 |
| 2,354,914 | 8/1944 | Goldstein | 72/479 |
| 2,709,070 | 5/1955 | Bielstein | 64/2 R |
| 3,396,572 | 8/1968 | Godsey | 72/452 |
| 2,297,160 | 9/1942 | Nally | 72/465 |

Primary Examiner—Charles W. Lanham
Assistant Examiner—Gene P. Crosby
Attorney—L. D. Wofford, Jr., G. J. Porter and John R. Manning

[57] ABSTRACT

A variable direction force coupler for transmitting a reciprocating force along a selectable curved path consisting of a flexible tube filled with rigid balls and including force transmission members at each end adapted to connect the coupler between an applied force and a body to receive the force.

4 Claims, 1 Drawing Figure

PATENTED OCT 24 1972
3,699,799
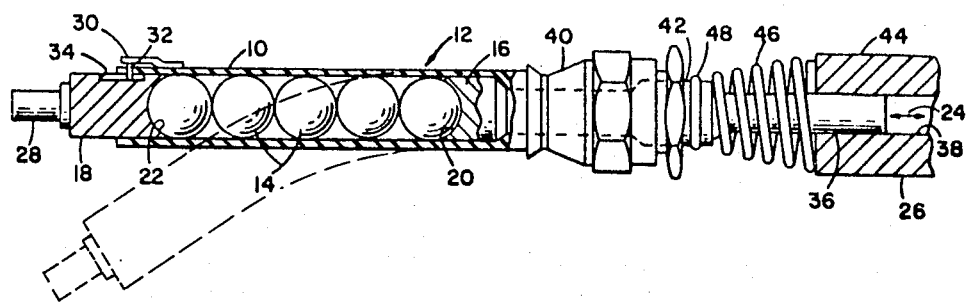

VARIABLE DIRECTION FORCE COUPLER

ORIGIN OF THE INVENTION

The invention described herein was made in the performance of work under a NASA Contract and is subject to the provisions of Section 305 of the National Aeronautics & Space Act of 1958, Public Law 85-568 (72 Stat. 435 42 USC 2457).

BACKGROUND OF THE INVENTION

1. Field of the Invention

This invention relates to devices for coupling forces along variable curved paths.

2. Description of the Prior Art

There are many applications wherein it is necessary or desirable to couple a battering or hammering force along a curved path. Further, in many such applications, the need exists to be able to vary the direction to conform to varying path requirements. For example, in riveting operations, it is often impossible to position the typical straight rivet tool so that it may couple force directly between a tool gun and variously positioned rivets. To overcome this, it has been the practice to make special angle attachments such as shown in Godsey U.S. Pat. No. 3,396,572.

SUMMARY OF THE INVENTION

A primary object of this invention is to provide a force coupler which may be used to transmit forces along any one of an infinite variety of curved paths and thus eliminate the necessity of specially designed force couplers.

Another object of this invention is to provide a force coupler particularly adapted to couple a reciprocating force along a selected curve path between a rivet gun and a rivet.

In accordance with this invention, a force coupler is constructed to include a flexible force transmission housing. The housing is substantially filled with a plurality of rigid balls, each being of a diameter corresponding substantially to the inner diameter of the housing. A force receiving rod or arm is connected at one end of the housing to couple an input force to the chain of balls therein, and a second rod or arm is connected at the opposite end of the housing to couple the output force of the coupler between the other end of the chain of balls and a work piece, such as a rivet.

BRIEF DESCRIPTION OF THE DRAWINGS

The single FIGURE of the drawings is a side view, partly in section, of an embodiment of the invention as adapted to be used with a rivet gun. The device is illustrated in phantom in a flexed position.

DESCRIPTION OF THE PREFERRED EMBODIMENT

Referring to the drawing, housing 10 of force coupler 12 is constructed of flexible tubing, or hose, such as a reinforced rubber hose used in hydraulic systems. A plurality of steel balls 14, such as used for ball bearings, are positioned within housing 10. They are of substantially the same diameter as the inner diameter of housing 10 and there are a sufficient number of them to be held in a contacting relationship between driver 16 and rivet set or anvil 18. Driver 16 and rivet set 18 each have curved surfaces, labeled surfaces 20 and 22, respectively, which spherically correspond to the mating surfaces of adjacent steel balls 14. Driver 16 and rivet set 18 are typically of steel and function together with balls 14 to transmit a reciprocating force as indicated by arrow 24 from rivet gun 26 to rivet 28.

Rivet set 18 is limited in travel by retaining spring assembly 30 which is attached to an appropriate end of housing 10. Arm 32 of retaining spring assembly 30 extends into groove 34 of rivet set 18 and rivet set 18 is thus retained in place unless arm 32 is raised out of groove 34. This prevents rivet set 18 from falling off of coupler 12 if coupler 12 is tilted with the rivet set end down.

The driven end 36 of driver 16 is adapted to mate with the particular rivet gun 26 with which it is to be used and it receives a reciprocating force from hammer 38 of rivet gun 26. Housing 40 encloses a portion of driver 16 and serves to provide a solid sleeve coupling to flexible housing 10, an end 42 of housing 40 being connected to the housing or frame 44 of rivet gun 26 by coupling spring 46. Coupling spring 46 is attached at one end to end 42 of housing 40 by an appropriate clamp 48 and at the other end by attachment means, not shown, to frame 44 of rivet gun 26. By this construction, driver 16 is free to move axially with an applied reciprocating force and yet force coupler 12 is attached to rivet gun 26 to prevent force coupler 12 from being propelled out of control away from rivet gun 26 if rivet gun 26 were operated without rivet set 18 being against a work piece, such as rivet 28.

Force coupler 12 is used by placing rivet set 18 against the head of rivet 28 and rivet gun 26 operated "on." This applies a reciprocating force through driver 16, balls 14, and rivet set 18 to rivet 28 which is thus driven or set. Housing 10 may be substantially bent or curved to avoid obstacles which would otherwise be in a path between rivet gun 26 and rivet 28. Housing 10 is shown in a flexed position in phantom in the drawing.

While this invention has been illustrated and described in terms of a riveting accessory wherein a reciprocating force may be applied along a curved path to a rivet, it is to be appreciated that the invention is not so limited in that it is applicable wherever a reciprocating or battering force must be transmitted along a readily variable curved path. The length of housing 10, the diameter of housing 10 and size of balls 14, may vary according to the particular range of paths to be encountered and magnitude of forces to be transmitted. Likewise, the end members, driver 16 and rivet set or anvil 18 would have end configurations to conform to the configurations of the driving tool used and work piece encountered, respectively.

What is claimed as my invention is:

1. A variable direction force coupler comprising:

an elongated flexible tube;

a plurality of balls, substantially corresponding in diameter to the inner diameter of said flexible tube and positioned within said tube in a contacting relation;

first force transmission means fitting into one end of said tube and having a spherically surfaced portion in engagement with a said ball for applying a force to said balls; and second force transmission means fitting into the other end of said tube and having a spherically surfaced portion in engagement with a said ball for transmitting a force from said balls to a work surface said second force transmission means comprising an anvil having a groove along its outer surface adjacent to said other end of said tube.

2. A variable direction force coupler as set forth in claim 1 comprising a retaining spring assembly attached to said tube, said retaining spring assembly having an arm, one end of said arm extending into a longitudinal groove for limiting the outward travel of said anvil.

3. A variable direction force coupler as set forth in claim 2 wherein said first force transmission means comprises an elongated shaft and includes means for coupling said shaft to force generating means.

4. A variable direction force coupler as set forth in claim 3 further comprising spring means interconnecting said one end of said tube to said force generating means.

* * * * *